United States Patent [19]

Niesen

[11] Patent Number: 4,997,565

[45] Date of Patent: Mar. 5, 1991

[54] LABORATORY SCALE ULTRAFILTRATION APPARATUS

[76] Inventor: Lawrence J. Niesen, 260 Prospect Ave., Apt. 859, Hackensack, N.J. 07601

[21] Appl. No.: 269,640

[22] Filed: Nov. 10, 1988

Related U.S. Application Data

[63] Continuation-in-part of Ser. No. 874,549, Jun. 16, 1986, Pat. No. 4,801,381.

[51] Int. Cl.$^5$ ............................................. B01L 61/18
[52] U.S. Cl. ................................ 210/321.84; 210/343
[58] Field of Search .................... 210/343, 321.84, 344

[56] References Cited

U.S. PATENT DOCUMENTS

| | | | |
|---|---|---|---|
| 3,343,681 | 9/1967 | Madden | 210/343 |
| 3,831,763 | 8/1974 | Breysse et al. | 210/346 X |
| 3,872,015 | 3/1975 | Madsen | 210/346 |
| 3,984,324 | 11/1975 | Wang | 210/232 |
| 4,597,868 | 7/1986 | Watanabe | 210/221.84 X |

FOREIGN PATENT DOCUMENTS

| | | |
|---|---|---|
| 0049055 | 4/1982 | European Pat. Off. . |
| 0066198 | 12/1982 | European Pat. Off. . |
| 3231251 | 3/1983 | Fed. Rep. of Germany . |
| 1563313 | 4/1969 | France . |
| 2281781 | 3/1975 | France . |
| 82/00102 | 1/1982 | World Int. Prop. O. . |

Primary Examiner—Frank Spear
Attorney, Agent, or Firm—Kenyon & Kenyon

[57] ABSTRACT

Apparatus for separating a base liquid into permeate and retentate fractions includes a semi-permeable membrane and a membrane support plate. The support plate has a plurality of permeate flow channels, equally dimensioned and mutually parallel, formed in its surface. Longitudinal ribs define the permeate flow channels. A manifold distributes a flow of base liquid to one end of the membrane and clamps the membrane to the upper surfaces of the longitudinal ribs, so that the fluid pressure urges the membrane inward where the membrane overlies the permeate flow channels, thereby forming base liquid flow channels in the membrane. Because the base liquid flow channels are of equal dimensions, the flow velocity within the channels is equal across the face of the support plate, minimizing the deposition of undesirable solids. Also, transverse ribs within the permeate flow channels bear against the bottoms of the base liquid flow channels, causing the flow within the base liquid flow channels to become turbulent and thereby further inhibiting solids deposition.

59 Claims, 4 Drawing Sheets

LABORATORY SCALE ULTRAFILTRATION APPARATUS

BACKGROUND OF THE INVENTION

This application is a continuation-in-part of application Ser. No. 874,549, filed June 16, 1986, entitled ULTRAFILTRATION APPARATUS, issued as U.S. Pat. No. 4,801,381.

This invention pertains to the art of separating a liquid into fractions by pressure-driven flow through semi-permeable membranes, known as ultrafiltration, and more particularly, to laboratory apparatus adapted to accomplish that task on a small scale.

Ultrafiltration is the general term applied to the process of separating a liquid into fractions by pressure-driven flow through semi-permeable membranes. By proper selection of the membrane material, it is possible to separate liquids based upon their molecular weight, thus obtaining a permeate of extremely high purity. Such processes find wide application in a number of industries, as for separating milk used in cheese making into whey and milk precheese product, and in concentrating antibiotics from a fermentation broth.

Two distinctions are important in identifying the position of the present invention in relation to the art. First, the art classifies filtration processes into microfiltration, ultrafiltraton, and hyperfiltration (or reverse osmosis). The distinction between these processes is based primarily upon the pore size of the membranes employed and the pressure at which the systems operate. Microfiltration operates at a relatively large pore size (0.02-2.0 micron) and low pressure (30-150 psi). Hyperfiltration, or reverse osmosis, operates at pore sizes from about 5-15 angstroms down to the micromolecular and ionic size range (molecular weights of 150 and below), and at pressures in the range 200-1000 psi. Ultrafiltration operates at intermediate values, with molecular weight cutoffs ranging from 200 to 350,000 and pore diameters of from about 10 to 1000 angstroms. Although the preferred embodiment of the present invention is directed primarily toward ultrafiltration and microfiltration, the invention would operate equally well in a microfiltration role, and it could be adapted to hyperfiltration equipment as well.

Second, the field of ultrafiltration encompasses several means of effecting the separation of a liquid into fractions. At the outset, it should be understood that ultrafiltration does not operate in a manner analogous to "filtering" processes, in which a liquid is passed through a filter disposed transverse to the flow path, with undesirable solids being retained by the filter and the objective being a clarified liquid output. Rather, ultrafiltration seeks to separate a base liquid into two fractions by placing the liquid in the presence of a semi-permeable membrane; one portion of the liquid (termed the permeate) will pass through the membrane, and the other will remain in the base liquid stream, termed the retentate. Thus, ultrafiltration systems pass a base liquid across, rather than through, the filtration means. Also, depending upon the specific application, one fraction or the other may be the desired product of the process. For example, in cheese manufacture, the desired product is the retentate (precheese liquid), while in a juice manufacturing process the object is the permeate, a clarified fruit juice.

Several methods of ultrafiltration have been suggested by the art. Of primary concern to the present invention are the methods classified as "plate and frame" ultrafiltration, in which a series of plates support semi-permeable membranes, and the base liquid is passed across these membranes for filtration. Other methods include spiral membrane apparatus, in which the membrane is wrapped in a perforate collection tube, the base liquid being passed through the tube longitudinally. A membrane also may be presented in tubular form, with the base liquid passed within the tube and the permeate passing through the tube and collecting within the membrane housing. Alternatively, hollow fiber membranes have been offered, with a bundle of hollow fiber membranes contained within a tubular housing. Base liquid is passed though the cores of the fibers, and permeate is collected from the channels surrounding the fibers. The disadvantages of these methods, when compared to the present invention, will be clear to those skilled in the art.

The preferred plate-and-frame processes depend, of course, on the presentation of a large membrane area to the base liquid, and it is known in the art to employ membrane supports, with membrane material disposed on both sides of a plate and the plates arranged in a stack. Generally, such a stack is provided with input and output flow passages for the base liquid, disposed on opposite sides of the stack such that liquid can flow to one side of a plate and thence between the membranes of adjacent plates, allowing the base liquid to come into intimate contact, under pressure, with the membrane surface to permit ultrafiltration. Because one pass through the system generally does not suffice to provide complete extraction of the desired constituents, the retentate usually is recirculated through the ultrafiltration apparatus several times. Further, it is known to divide the stack into subassemblies, each subassembly having input and output passages, such that liquid flows in parallel across the membranes of all support members of a subassembly, and the output of one subassembly flows to the input of a succeeding subassembly.

The apparatus available to date has exhibited a number of problems. Ultrafiltration equipment is evaluated based on two criteria—the concentration ratio, reflecting the maximum concentration to which the base liquid can be processed (defined as the ratio of initial volume of base liquid to the final volume after processing), and the flux rate, defined as the volume of permeate that passes through a given area of membrane per unit of time, generally expressed as gallons of permeate per square foot of membrane per day (GFD) or liters of permeate per square meter of membrane per hour. These two factors will determine the specifications of an ultrafiltration apparatus chosen for a particular application.

Typical of the apparatus offered by the art is the ellipsoidal structure seen in U.S. Pat. No. 3,872,015, issued to Madsen. As disclosed, the apparatus is similar to that discussed above, with each plate-like member being ellipsoidal in form. Each plate also has two openings formed toward the ends of the major axis, so that when the stack is formed by passing retaining bolts through the aligned openings, inlet and outlet passages are formed. Curved grooves in the surface of the plate extend from one opening to the other. These grooves generally can be described as forming a set of concentric ellipses of increasingly smaller periphery. Blocking members placed in one opening of periodically-spaced members serve to divide the stack into subassemblies, as discussed.

Base liquid flows through the inlet passage of a subassembly and passes into the gap between adjacent membranes. The fluid pressure of the base liquid forces both membranes against the respective plate surfaces, so that liquid flows within channels corresponding to the surface grooves, and therein lies the fundamental flaw with this design. Given that the fluid pressure at the head of all channels is equal and that the flow path in the outer channels is significantly longer than that of the inner channels, basic principles of fluid dynamics would lead one to expect the flow velocity in the inner channels to be significantly greater than in the outer channels. That expectation is borne out in operation. As the viscosity of the retentate increases, fluid velocity in the outer channels decreases, ultimately dropping to zero. Before that point, however, the solids entrained in the liquid are deposited, and the channel rapidly plugs. The relatively short inner channels in effect "short-circuit" the flow pattern, and this process continues as the base liquid becomes more concentrated with repeated recirculation through the system.

The assignee of this patent has attempted to alleviate this problem by eliminating the central portion of the plate, leaving an ellipsoidal ring, and by increasing the depth of the outer (longer) channels. That design does ameliorate the plugging problem, but at the expense of reduced output (from reduced membrane area) and higher cost (from inefficient production of membrane material—the cutout central section cannot be put to other use). Moreover, observation of this design reveals that the uneven flow rate leads to uncertainty as to which channels will plug first, as sometimes an inner channel plugs, and at other times an outer channel will become blocked. The problems with this design stem directly from the provision of flow channels of uneven length, and appear inherent in such configurations. Clearly, this approach does not meet the needs of the antibiotic industry, or indeed the needs of any application requiring ultrafiltration of base liquids over a wide viscosity range.

An alternative approach is disclosed in U.S. Pat. No. Re. 30,632 (a reissue of U.S. Pat. No. 3,831,763), to Breysse. The basic structure of this device is similar to that discussed above, but here the plates are rectangular, and joining members are disposed between adjacent plates to promote sealing and to define the space into which the base liquid flows between plates. Each plate has two openings, defining inlet and outlet passages, and intermediate plates, having only one such opening, serve to divide the stack into subassemblies. A depression is formed into the surface of both sides of a plate, and packing material is carried therein to permit collection of permeate, and the membranes are carried atop this material. A variant form of this device, offered by the assignee of this patent, substitutes raised ridges, formed in the surface of the depression and extending across same.

Two problems have arisen in the application of this device to fields requiring operation over wide viscosity ranges. First, the inclusion of joining members (typically, gaskets) at the outer periphery of each plate severely limits the pressure at which the base liquid can be introduced into the inlet passages. Of course, such a limitation restricts the overall flow rate and the resultant output.

More seriously, this design again does not prevent deposition of solids from the base liquid, particularly in antibiotic applications. As with the previous device, the problem stems from the basic principles of fluid dynamics. It is well known that fluid flow within a channel is not uniform but exhibits a velocity profile from one side of the channel to the other. Velocity is lowest at the sides of the channel (indeed, it is zero within a boundary layer in contact with the channel wall). Further, the velocity differential across the channel is related to the viscosity of the fluid (higher viscosity produces a higher differential) and to the size of the channel (wider channels result in a more pronounced zone of significantly lower velocity). These theoretical predictions again are seen to occur in practice. When employed in an antibiotic application, where the base fluid contains a high level of suspended solids, flow velocity of the broth at the edges of this device is not sufficiently high to avoid deposition, restricting the flow to an increasingly small area toward the center of each plate. Output suffers, both from the reduced permeate flow and from the increased requirement to clean and change membranes.

A common shortcoming of these devices is the failure to provide uniform flow across the surface of each plate, at flow rates that offer economically-attractive permeate recovery. Rather, it was left to the inventors of the present invention to devise apparatus that functions over the viscosity ranges required by the antibiotic and other industries.

These problems are accentuated when dealing with apparatus scaled for laboratory use rather than for full-scale production. The low flow rates of such apparatus exacerbate the difficulties presented by solids deposition discussed above. Although both the ellipsoidal and flat-plate devices noted above have been adapted to laboratory use, both such devices display the same disadvantages as seen in their full-scale embodiments. What is missing from the laboratory is a small-scale unit that provides a high permeate yield, coupled with the ability to handle a wide range of viscosities. The present invention provides such a device.

SUMMARY OF THE INVENTION

It is an object of this invention to provide a laboratory scale ultrafiltration apparatus that permits improved operation over a wide range of base liquid viscosities.

Another object of the invention is an improved membrane support for an laboratory scale ultrafiltration apparatus.

A further object of the invention is to provide a membrane support for an laboratory scale ultrafiltration apparatus that allows for uniform flow across the surface of the support.

Yet another object of the invention is the provision of a laboratory scale ultrafiltration apparatus that offers a high permeate yield.

These and other objects are achieved in the present invention. In a preferred embodiment, a laboratory scale ultrafiltration apparatus includes a semi-permeable membrane for separating the liquid into permeate and retentate fractions and a support plate for carrying the membrane. The support plate has a generally flat rectangular form and has at least one support face adapted for receiving the membrane thereon.

A plurality of permeate flow channels for gathering the permeate fraction is formed into the surface of the support plate, arranged to underlie the membrane.

These channels are preferably identically dimensioned and arranged in a mutually parallel array on the face of the support plate. Longitudinal ribs define the permeate flow channels, the longitudinal ribs of the outermost such channels being contiguous with the face of the support plate. Longitudinal channels are disposed adjacent each of the longitudinal ribs. Transverse ribs, generally at right angles to the longitudinal channels and ribs, extend between adjacent longitudinal channels and define transverse channels therebetween.

The flow of base liquid across the face of the membrane forces the membrane to deform inward between the longitudinal ribs, forming a plurality of base liquid flow channels in the membrane. To provide optimum retentate flow, the top surface of the transverse ribs preferably lies below the top surface of the longitudinal ribs. Similarly, to provide optimum permeate flow, the bottom of the transverse channels preferably lies above the bottom of the longitudinal channels.

A permeate extraction port, preferably located at the side of the support member, is in fluid communication with each longitudinal channel, preferably by means of a conduit formed in the interior of the support plate. This port permits collection of permeate and preferably is adapted for connection to fluid communication means, such as plastic tubing, for conveying the permeate to a collection means.

In operation, the base liquid flows across the face of the membrane, forming the base liquid flow channels as described. Based on the characteristics of the membrane, the desired permeate fraction passes through the membrane into the permeate flow channel, where it flows to the longitudinal channel and thence to the extraction port.

BRIEF DESCRIPTION OF THE DRAWINGS

FIGS. 6 (a) and (b) are detail side views taken along plane VI of FIG. 2.

DETAILED DESCRIPTION OF A PREFERRED EMBODIMENT

A preferred embodiment of the invention generally includes a support plate, carrying two semi-permeable membranes. The support plate is disposed between upper and lower manifold plates, each of which is adapted to introduce base liquid at one end of the support plate, flow that liquid across the face of the membrane, and extract retentate at the other end of the support plate. Permeate passes through the membrane, flows through permeate flow channels formed in the face of the support plate, and exits for collection through a permeate extraction port. Understanding of the invention will be facilitated by first considering the support plate in detail, and then considering the apparatus as a whole.

Figure 1:
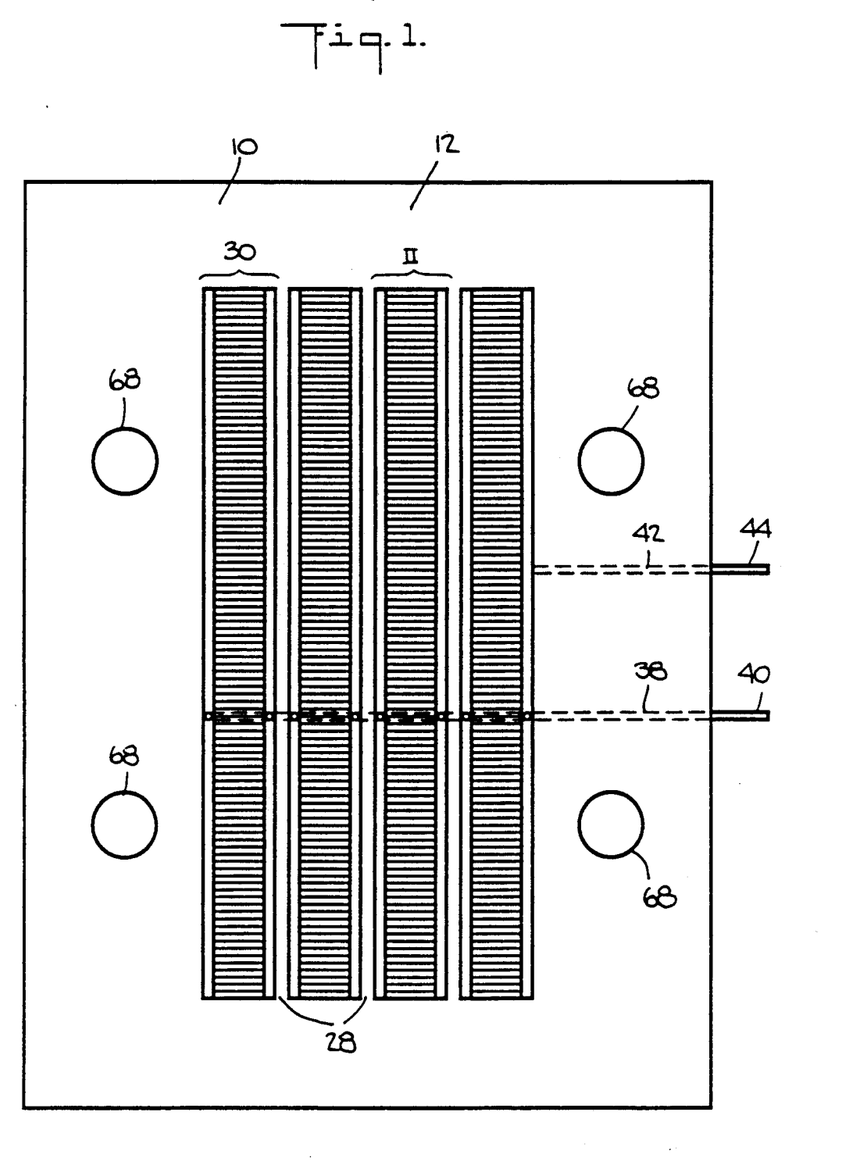
FIG. 1 is a top view of an embodiment of the membrane support plate of the present invention.
Figure 3:
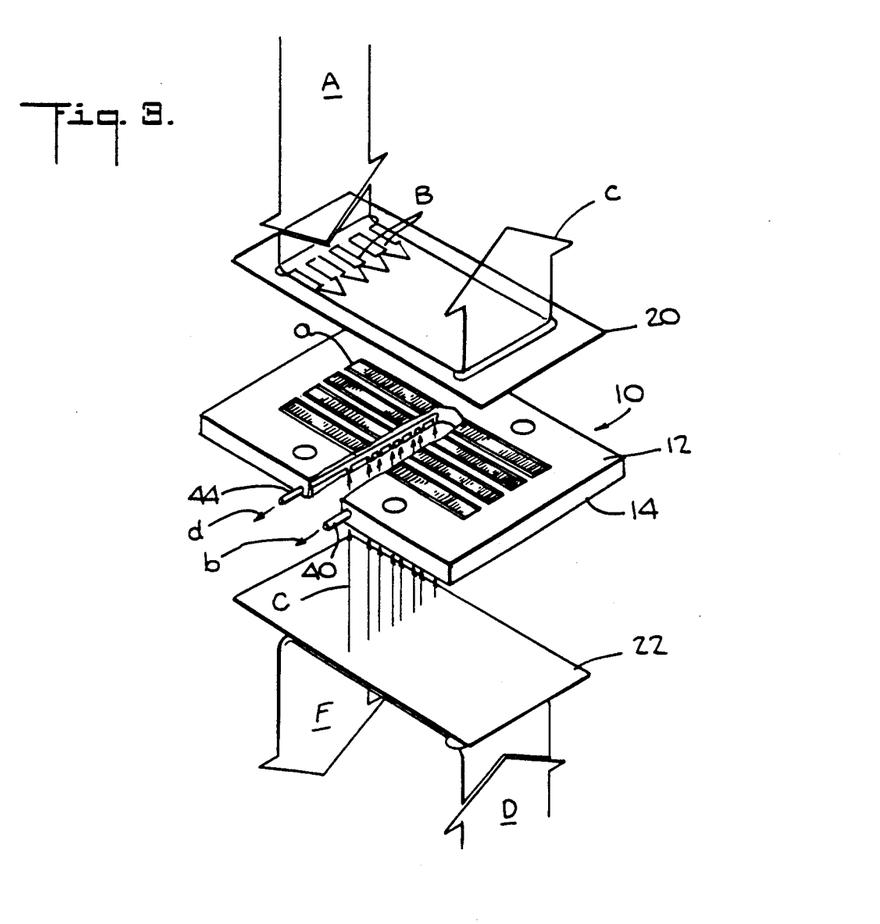
FIG. 3 is an exploded pictorial illustrating the operation of the embodiment shown in FIG. 1.

FIG. 1 shows a support plate 10 of the present invention. As seen, the plate is generally flat and rectangular in form, with two faces 12, 14 (FIG. 3). Discussion herein will focus on the face shown, but it should be understood that the two faces are identical, except as specifically noted. The plate preferably is formed of a molded plastic material, as will be understood by those in the art. For use in the antibiotic industry, where freedom from possible contamination is important, it is preferred to employ a polysulfone plastic, formed into a single-piece plate. The plate shape is not critical, except as it affects the flow pattern, as discussed below. In the embodiment shown, the plate dimensions are about 8 inches by about 6 inches.

Figure 2:
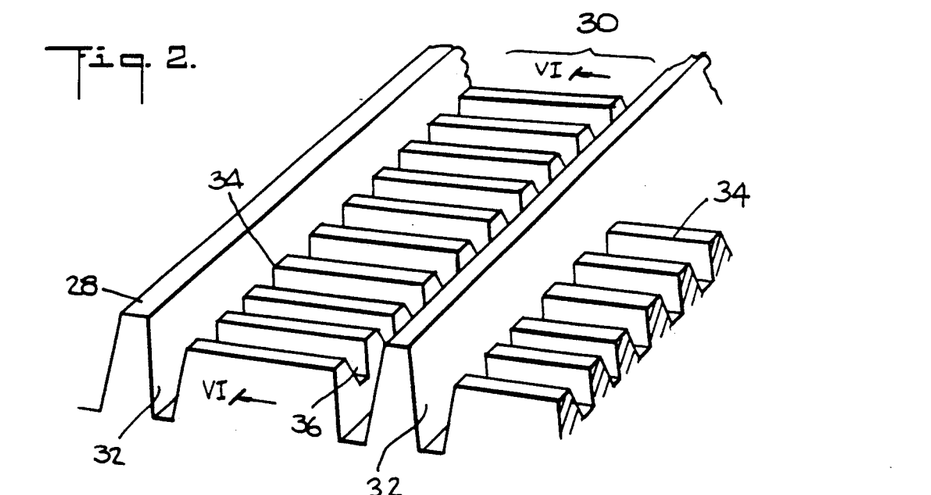
FIG. 2 is a detail pictorial of area II of FIG. 1.
Figure 6A:
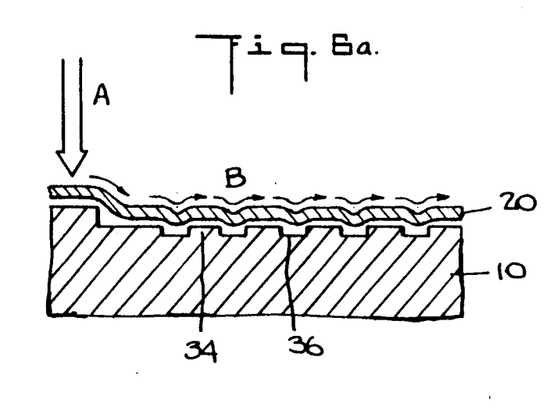
Figure 6B:
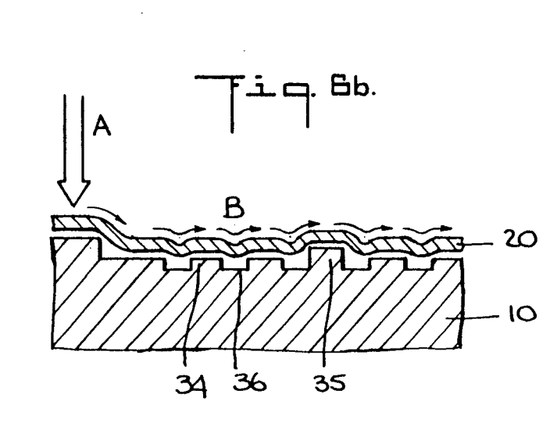

The structure of a plate surface can be seen in the various views of FIGS. 1, 2 and 6. Longitudinal ribs 28 extend across the face of the support plate, pairs of such ribs defining flow channels 30. In the case of the outermost channels, the longitudinal ribs are contiguous with the plate material. These channels are mutually parallel, and preferably equally dimensioned. As described below, the parallel arrangement and equal dimensions of the permeate flow channels are provided to produce the desired flow pattern in the base liquid flow channels. The number and dimension of such channels is chosen based on the fluid flow characteristics of the base liquid. The embodiment depicted in FIG. 1 has a total of 4 channels and 5 longitudinal ribs, the inner channels requiring but one rib to separate and define such channels. Longitudinal channels 32 lie adjacent each longitudinal rib, two such channels being provided for each permeate flow channel. The top surfaces of the longitudinal ribs should be relatively flat and flush with or below the surface of the support plate.

Between the longitudinal ribs and channels lies a series of transverse ribs 34 and channels 36, generally at right angles to the longitudinal ribs and channels. As seen more clearly in FIGS. 2 and 6(a), the tops of the transverse ribs are recessed slightly below the tops of the longitudinal ribs, and the bottoms of the transverse channels lie above that of the longitudinal channels. The relative depths of the transverse and longitudinal channels is not critical, but it has been found that the arrangement shown is effective in obtaining the desired flow pattern, as discussed in more detail below.

An alternate embodiment of the invention is shown in FIG. 6 (b). This embodiment is identical to that discussed above except that some transverse ribs 35 have a height greater than that of transverse ribs 34, yet remaining below the level of longitudinal ribs 28. This height differential imparts improved flow characteristics to the base liquid flow pattern, as discussed below. The number of increased-height ribs can be derived empirically from flow data, a process well within the capability of those in the art. It is preferred that 20% of the total number of ribs be of increased height.

Other combinations of ribs and channels could be substituted for those discussed above. For example, a single longitudinal channel could be located between each pair of longitudinal ribs. Or, one could dispense with the transverse ribs and channels by providing a series of intermediate longitudinal ribs between the longitudinal ribs discussed, these intermediate ribs having tops at a lower level than those of the primary longitudinal ribs. Alternatively, one could utilize an internal permeate drainage system, as is known in the art, rather than the permeate flow system described above. Such systems carry significant disadvantages, however, such as a tendency to leak (most serious in food and antibiotic applications), and a limitation on the permeate flow rate. In addition, such plates are more difficult to manufacture, and hence more costly, than single-piece designs.

A conduit 38 is formed in the interior of the support plate, in fluid communication with each longitudinal channel via drain ducts 39. The conduit and ducts can be formed during the molding of the plate, or they can be machined at a later time. The conduit further communicates with permeate extraction port 40, preferably located on a long side of the support plate. This structure thus provides for permeate flow from the transverse channels to the longitudinal channels, and thence through the drain ducts to the conduit, exiting through the permeate extraction port. As shown, this port projects outward from the side of the plate, for connection with a means for collecting permeate, such as plastic tubing, discussed below. Other collection means would require alternate port structures, as would be clear to those in the art.

Although an ultrafiltration apparatus could be constructed with a support plate having only one surface with permeate flow channels formed therein, it is preferred that such channels be formed in both surfaces, as shown in FIG. 3. As seen there, one membrane 20 is carried on upper surface 12, and a second identical membrane 22 is disposed on lower surface 14. The features of surface 14 are identical to those described in connection with surface 12, above. A second permeate extraction port 42, conduit (not shown) and set of drain ducts (not shown) provide a fluid pathway for permeate from the surface 14 in a manner identical to that of the surface 12 discussed above.

The membrane and support plate cooperate in the following manner to produce an optimum flow pattern across the membrane, as depicted in FIGS. 3 and 6(a). Base liquid impinges on each surface of the support plate in a wide flow transverse to the support plate, dimensioned to extend across the portion of the membrane overlying the permeate flow channels, as shown by arrows A and D in FIG. 3.

Fluid flows across the support plate face on the membrane surface, and as it does so, fluid pressure forces the membrane against the longitudinal ribs 28 and transverse ribs 34. Because the tops of the transverse ribs are lower than those of the longitudinal ribs, the membrane is urged inward against the top surfaces of the transverse ribs, to form base liquid flow channels in the membrane surface, depicted as arrows B in FIG. 3. These channels are relatively narrow; therefore, the fluid velocity is relatively uniform across each channel, and hence across the entire face of the support plate.

Further, fluid pressure also forces the membrane into the spaces between the transverse ribs, giving the base liquid flow channel a somewhat corrugated surface, as most clearly seen in FIG. 6(a). Consequently, the base liquid flow path is somewhat sinusoidal, producing turbulent flow within the base liquid flow channel. Such flow precludes the formation of the boundary layer seen in laminar flow regimes, thus inhibiting undesirable deposition of particulate matter on the membrane.

At the end of the base liquid flow channels the streams again converge as a single retentate flow transverse to the support plate, illustrated by arrows C and F. The mechanism by which the liquid flow is directed to and from the support plate is set out in detail below.

Permeate passes through the membrane to collect in transverse channels 36 (arrows a and c). It should be noted that these channels (and the longitudinal channels 32) are below the level of the membrane, which is supported by the longitudinal and transverse ribs. It has been found that provision of such channels, permitting the permeate to flow between the support plate and the bottom surface of the membrane without making contact with the membrane, results in a relatively free flow and a higher permeate flow rate. From the transverse channels, permeate flows to the longitudinal channels 32 and thence through drain ducts 39 to the conduit 38, which receives the permeate from all of the longitudinal channels. Permeate extraction port 40 provides an exit point (arrows b and d) to conduct the permeate to suitable collection means, as discussed below.

Figure 4:
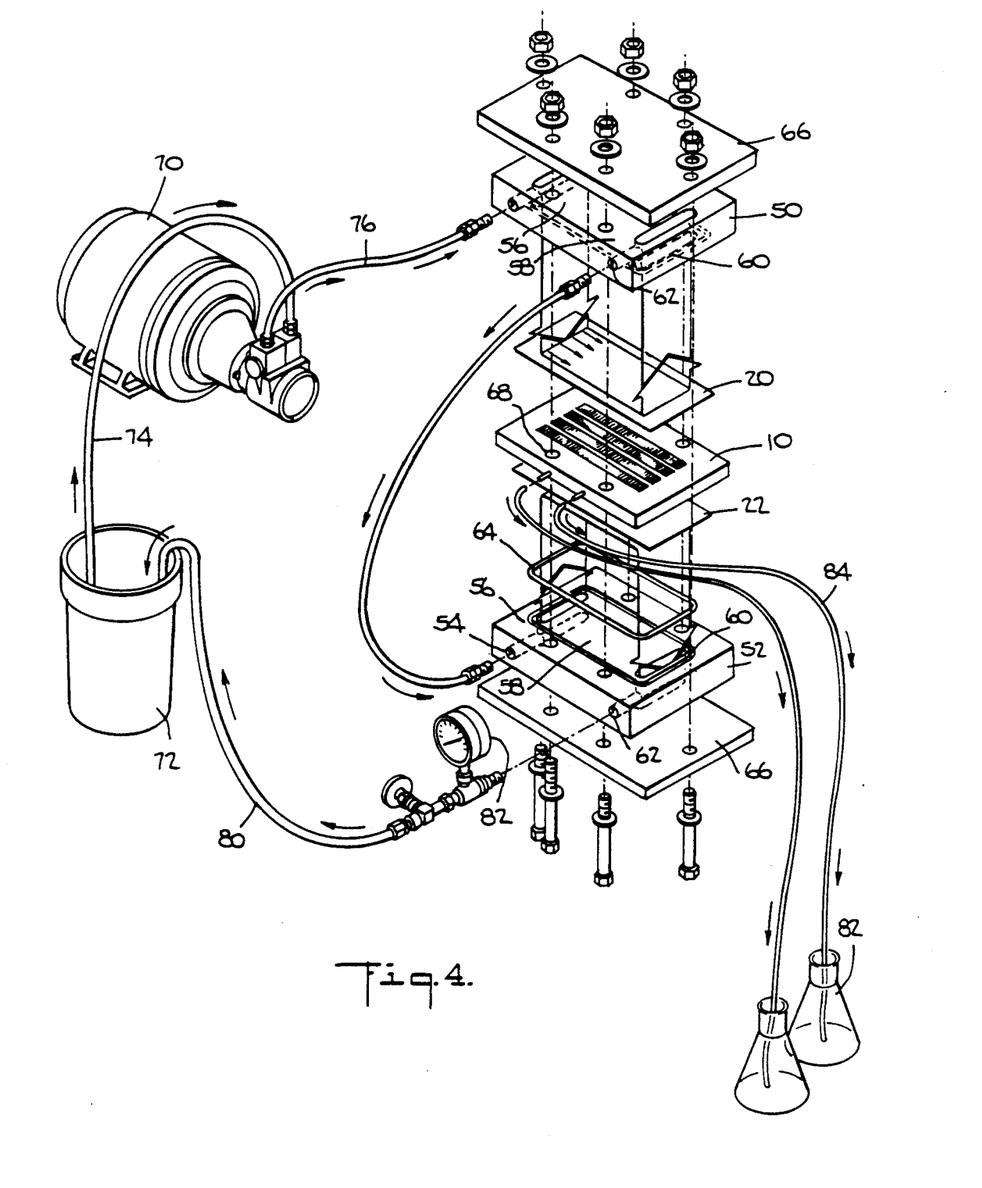
FIG. 4 is an exploded pictorial showing an embodiment of a complete laboratory scale ultrafiltration apparatus according to the present invention.
Figure 5:
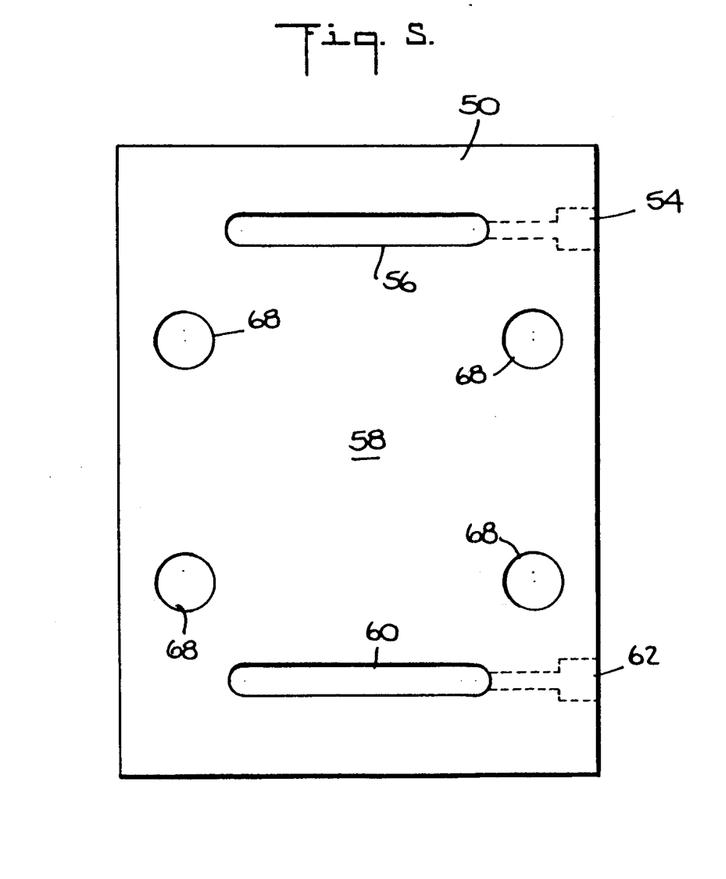
FIG. 5 is a top view of an embodiment of a manifold plate of the present invention.

Turning to a consideration of the device as a whole, the support plate is integrated into a laboratory scale ultrafiltration apparatus, shown in FIG. 4. The support plate 10, with upper and lower membranes 20 and 22, is clamped between upper and lower manifold plates 50 and 52, respectively. These plates are identically formed, as described here, and are oriented with their working surfaces turned toward the support plate. These plates are preferably formed from a rectangular block of strong material, such as acrylic plastic, and may be formed of a clear material to assist in monitoring operation of the apparatus. The upper manifold plate 50 is illustrated in FIG. 5. The elements of each such plate are identical and are indicated with like identification numerals in FIG. 4.

The manifold plate receives a flow of base liquid, distributes that flow across the portion of the membrane overlying the permeate flow channels, and outputs the flow to the remainder of the system. Input port 54 extends from a side of the plate inward to a depth sufficient to register with the outboard edge of the support plate permeate flow channel when the support plate is mounted on the manifold plate. Input manifold 56 extend from the input port to the working surfaces, directing flow from the input port to those surfaces. At the opposite end of the manifold plates, output manifold 60 communicate with output port 62 in the manner described in connection with the input components. Flow zone 58 is that portion of the manifold plate lying between the input and output manifolds. This area is at a level coincident with that of the remainder of the working surface. Such design positively clamps the membrane against the longitudinal ribs of the support plate, insuring that base liquid is urged against those portions of the membrane overlying the permeate flow channels, thereby forming the base liquid flow channels.

To prevent leakage, O-rings 64 may be carried between the manifold plates and the support plate/membrane assembly, as will be appreciated by those in the art.

The manifold plates, membranes and support plate may be assembled into an integral unit between compression plates 66, secured by bolts or other suitable fastening means. Apertures 68 are formed in the support plate and manifold plates to align the elements and allow passage of the fastening means.

The upper and lower sections of the apparatus shown in FIG. 4 form separate ultrafiltration modules, which here are arranged in series. That is, base liquid is passed across first one membrane and then the other, with permeate removed during each step. Fluid pressure for the system is provided by a pump 70, which may be chosen from among the many varieties commercially available to the art. Parameters, such a flow rate and pressure, are established by conventional techniques.

The pump employs tubing, preferably about ⅜ inch diameter plastic tubing. The pump draws base liquid from a reservoir 72 via feed tube 74 and passes it to the first manifold's input port (here the upper manifold plate 50) through input tube 76. Retentate emerges from the first manifold's output port and proceeds by connector tube 78 to the second manifold's input port. Return tube 80 carries retentate back to the reservoir from the second manifold's output port. A pressure gauge 82 may be connected to the return line to monitor pressure drop across the system. Conventional fittings are provided for attaching the tubing to the system components.

Alternatively, internal passages formed in the manifold plates, communicating through apertures formed in the support plate, could substitute for the connector tube 78.

Permeate removed through permeate extraction ports 40 and 42 is conveyed to suitable receptacles 82 by output tubing 84.

As will be understood by those in the art, the number of passes across membrane surfaces required to produce the desired extraction of permeate can be determined empirically, and the system can be designed accordingly. Depending on economic and time considerations, fluid can be passed across the same membrane, or pair of membranes repeatedly, or further units such as that shown in FIG. 3 can be assembled to multiply the filtration per pass through the system.

The present invention has presented two distinct advantages over the devices heretofore available to the art. First, apparatus according to the invention has exhibited a superior ability to deal with high-viscosity liquids, such as fermentation broths containing protein, enzymes and cell debris. In applications where conventional apparatus would rapidly clog, units according to the invention proved able to carry out successful separations for extended periods. Second, in those applications where conventional apparatus could perform separations, the present invention carried out such operations with a markedly greater separation rate. The tests reported in U.S. Pat. No. 4,801,381, identified above, illustrate the comparative advantage achieved by the present invention.

Of course, those in the art will understand that modifications and alterations can be made to the embodiments shown here, without departing from the spirit of the invention. For example, the shape of the support plate could be altered, or the precise configuration of the flow channels could be changed. These and other changes may be made within the scope of the invention, which is defined solely by the claims appended hereto.

I claim:

1. Cross-flow apparatus for separating a base liquid into a permeate fraction and a retentate fraction comprising:

semi-permeable deformable membrane means for separating the base liquid into the fractions;

a plurality of separate base liquid flow channel means, mutually parallel and substantially equally dimensioned, impressed in said deformable membrane means for channeling the flow of the base liquid such that the base liquid flows substantially tangentially across said membrane means, said base liquid flow channel means being dimensioned such that the fluid velocity of said base liquid is substantially uniform across the membrane means, a portion of said base liquid comprising the permeate fraction flowing through said membrane means to the opposite other side of the membrane means; and support plate means for carrying said deformable membrane means, said support plate means having a generally flat form having support plate channel means therein for deforming said membrane means and having at least one support face adapted for receiving said membrane means thereon.

2. The apparatus of claim 1 wherein said support plate means includes a plurality of permeate flow channel means comprising said support plate channel means for gathering the permeate fraction, each such permeate flow channel underlying a said base liquid flow channel means and separated therefrom by said membrane means, with each such permeate flow channel including longitudinal ribs defining said permeate flow channel means, extending the length of said flow channel means;

at least one longitudinal channel disposed within said permeate flow channel;

transverse ribs, generally at right angles to said longitudinal channels and ribs, extending between adjacent longitudinal ribs and defining transverse channels therebetween; and port means, in fluid communication with said longitudinal channels, for draining the permeate fraction.

3. The apparatus of claim 2 wherein said transverse ribs are recessed from the level of said longitudinal ribs.

4. The apparatus of claim 2 wherein said transverse ribs include first transverse ribs, recessed from the level of said longitudinal ribs, and second transverse ribs, recessed from the level of said longitudinal ribs by a distance greater than the recess distance of said first transverse ribs.

5. The apparatus of claim 4 wherein said first transverse ribs constitute about 20% of the total number of said transverse ribs.

6. Cross-flow apparatus for separating a base liquid into a permeate fraction and a retentate fraction comprising:

two semi-permeable deformable membrane means for separating the base liquid into the fractions;

a plurality of separate base liquid flow channel means, substantially equally dimensioned, impressed in said deformable membrane means for channeling the flow of the base liquid such that the base liquid flows substantially tangentially across said membrane means, said base liquid flow channel means being dimensioned such that the fluid velocity of said base liquid is substantially uniform across the membrane means, a portion of said base liquid comprising the permeate fraction flowing through said membrane means to the opposite other side of the membrane means; and support plate means for carrying said deformable membrane means, said support plate having a generally flat form having support plate channel means therein for deforming said membrane means and having two support faces adapted for receiving said membrane means thereon, each said support face including a plurality of permeate flow channel means comprising said support plate channel means for gathering the permeate fraction, each such permeate flow channel means underlying a said base liquid flow channel means and separated therefrom by said membrane means, with each such permeate flow channel means including longitudinal ribs defining said permeate flow channel means, extending the length of said flow channel means, the outermost of said longitudinal ribs being contiguous with the material of said support plate;

longitudinal channels disposed adjacent said longitudinal ribs; and transverse ribs, generally at right angles to said longitudinal channels and ribs, extending between adjacent longitudinal ribs and defining transverse channels therebetween, said transverse ribs being recessed from the level of said longitudinal ribs;

port means, in fluid communication with said longitudinal channels, for draining the permeate fraction.

7. The apparatus of claim 6 wherein said transverse ribs include first transverse ribs, recessed from the level of said longitudinal ribs, and second transverse ribs, recessed from the level of said longitudinal ribs by a distance greater than the recess distance of said first transverse ribs, said first transverse ribs constituting about 20% of the total number of said transverse ribs.

8. Cross-flow apparatus for separating a base liquid into a permeate fraction and a retentate fraction comprising:

semi-permeable deformable membrane means for separating the base liquid into the fractions;

a plurality of separate base liquid flow channel means, substantially equally dimensioned, impressed in said deformable membrane means for channeling the flow of the base liquid such that the base liquid flows substantially tangentially across said membrane means, said base liquid flow channel means being dimensioned such that the fluid velocity of said base liquid si substantially uniform across the membrane means, a portion of said base liquid comprising the permeate fraction flowing through said membrane means to the opposite other side of the membrane means;

support plate means for carrying said deformable membrane means, said support plate means having a generally flat form having support plate channel means therein for deforming said membrane means and having at least one support face adapted for receiving said membrane means thereon, including a plurality of permeate flow channel means comprising said support plate channel means for gathering the permeate fraction, each such permeate flow channel means underlying a said base liquid flow channel means and separated therefrom by said membrane means, with each such permeate flow channel means including longitudinal ribs defining said permeate flow channel means, extending the length of said flow channel means;

longitudinal channels disposed adjacent said longitudinal ribs; and transverse ribs, generally at right angles to said longitudinal channels and ribs, extending between adjacent longitudinal ribs and defining transverse channels therebetween;

port means, in fluid communication with said longitudinal channels, for draining the permeate fraction; and manifold plate means for directing a flow of the base liquid across said membrane means in a direction parallel to said permeate flow channel means and abutting said support surface.

9. The apparatus of claim 8 wherein each of said manifold plate means includes first and second manifold plate means abutting said support surfaces of same on opposite sides of said support plate.

10. The apparatus of claim 8 wherein said manifold plate means includes an input port for receiving a flow of the base liquid;

an input manifold means, in fluid communication with said input port, for distributing said flow of liquid across the portion of said membrane overlying said permeate flow channels;

a flow zone on the surface of said manifold plate means, in bearing engagement with the portion of said membrane means overlying said longitudinal ribs, for channeling said flow of liquid within said base liquid flow channel means;

output manifold means, in fluid communication with said base liquid flow channel means, for receiving said flow and directing same in a direction transverse to said membrane means; and output port means, in fluid communication with said output manifold means, for discharging said flow from said manifold plate means.

11. Cross-flow apparatus for separating a base liquid into a permeate fraction and a retentate fraction comprising:

two semi-permeable deformable membrane means for separating the base liquid into the fractions;

a plurality of separate base liquid flow channel means, substantially equally dimensioned, impressed in said deformable membrane means for channeling the flow of the base liquid such that the base liquid flows substantially tangentially across said membrane means, said base liquid flow channel means being dimensioned such that the fluid velocity of said base liquid is substantially uniform across the membrane means, a portion of said base liquid comprising the permeate fraction flowing through said membrane means to the opposite other side of the membrane means; and support plate means for carrying said deformable membrane means, said support plate means having a generally flat form having support plate channel means therein for deforming said membrane means and having two support faces adapted for receiving said membrane means thereon, each said support face including a plurality of permeate flow channel means comprising said support plate channel means for gathering the permeate fraction, each such permeate flow channel means underlying a said base liquid flow channel means and separated therefrom by said membrane means, with each such permeate flow channel means including longitudinal ribs defining said permeate flow channel means, extending the length of said flow channel means, the outermost of said longitudinal ribs being contiguous with the material of said support plate;

longitudinal channels disposed adjacent said longitudinal ribs; and transverse ribs, generally at right angles to said longitudinal channels and ribs, extending between adjacent longitudinal ribs and defining transverse channels therebetween, said transverse ribs being recessed from the level of said longitudinal ribs;

port means, in fluid communication with said longitudinal channels, for draining the permeate fraction;

first and second manifold plate means for directing a flow of the base liquid across said membrane means in a direction parallel to said permeate flow channel means, dimensioned to overlie said support plate means and abutting said support surfaces of same on opposite sides of said support plate means, each such manifold plate including an input port for receiving said flow of liquid;

an input manifold means, in fluid communication with said input port, for distributing said flow of liquid across the portion of said membrane means overlying said permeate flow channel means;

a flow zone on the surface of said manifold plate means, in bearing engagement with the portion of said membrane means overlying said longitudinal ribs, for channeling said flow of liquid within said base liquid flow channel means;

output manifold means, in fluid communication with said base liquid flow channel means, for receiving said flow and directing same in a direction transverse to said membrane means; and output port means, in fluid communication with said output manifold means, for discharging said flow from said manifold plate means;

said input port of said second manifold plate means being in fluid communication with said output port of said first manifold plate means;

reservoir means in fluid communication with said output port of said second manifold plate means, for retaining the base liquid; and pump means in fluid communication with said input port of said first manifold plate means and with said reservoir means, for providing fluid pressure to said flow of base liquid.

12. Cross-flow apparatus for separating a base liquid into a permeate fraction and a retentate fraction comprising:

semi-permeable membrane means for separating the base liquid into the fractions;

a plurality of separate base liquid flow channel means, each disposed on a first side of said membrane means, said base liquid flow channel means being substantially mutually parallel, and being provided for channeling the flow of the base liquid such that the base liquid flows substantially tangentially across said membrane means, said base liquid flow channel means being dimensioned such that the fluid velocity of said base liquid is substantially uniform across the membrane means, a portion of said base liquid comprising the permeate fraction flowing through said membrane means and into a plurality of permeate flow channel means disposed on an opposite second side of the membrane means, said permeate flow channel means being disposed on support means for carrying said membrane means.

13. The apparatus recited in claim 12, wherein the base liquid flow channel means are substantially equally dimensioned.

14. The apparatus recited in claim 12, wherein the permeate flow channel means are formed in the support means and the support means comprises a plate means having a support face adapted for receiving the membrane means thereon.

15. The apparatus recited in claim 12, wherein the support means comprises first ribs oriented in at least one first direction.

16. The apparatus recited in claim 15, wherein the first ribs define the permeate flow channel means.

17. The apparatus recited in claim 15, wherein the first ribs define the permeate flow channel means and extend the length of the flow channel means, at least one first channel disposed within the permeate flow channel means.

18. The apparatus recited in claim 15, further comprising second ribs disposed between said first ribs oriented in at least one second direction.

19. The apparatus recited in claim 18, wherein the second ribs define second channels therebetween, and further comprising port means in fluid communication with the permeate flow channel means for draining the permeate fraction.

20. The apparatus recited in claim 18, wherein the second ribs are recessed from the level of the first ribs.

21. The apparatus recited in claim 20, wherein the second ribs include a first type of second ribs, recessed from the level of the first ribs, and a second type of second ribs, recessed from the level of the first ribs by a distance greater than the recess distance of the first type of second ribs.

22. The apparatus recited in claim 21, wherein the first type of second ribs constitute about 20% of the total number of said second ribs.

23. The apparatus recited in claim 18, wherein said first ribs comprise longitudinal ribs and said first channel comprises a longitudinal channel, said second ribs comprising transverse ribs, disposed generally at right angles to said longitudinal channel and ribs.

24. The apparatus recited in claim 15, wherein said membrane means is deformable and said first ribs deform said membrane means to form said base liquid flow channel means.

25. The apparatus recited in claim 17, wherein said membrane means is deformable and said first ribs and second ribs deform said membrane means to form said base liquid flow channel means.

26. The apparatus recited in claim 12, wherein said permeate and retentate fractions are separated based upon the molecular weight of the constituents thereof.

27. Cross-flow apparatus for separating a base liquid into a permeate fraction and a retentate fraction comprising:

semi-permeable membrane means for separating the base liquid into the fractions;

a plurality of separate base liquid flow channel means, each disposed on a first side of said membrane means and being dimensioned for channeling the flow of the base liquid substantially tangentially across said membrane means, said base liquid flow channel means being dimensioned such that eh fluid velocity of said base liquid is substantially uniform across the membrane means, a portion of said base liquid comprising said permeate fraction flowing through said membrane means and into a plurality of permeate flow channel means disposed on an opposite second side of the membrane means, said permeate flow channel means being disposed on a support means for carrying said membrane means, said base liquid flow channel means having means therein for creating turbulence in the flow of said base liquid.

28. The apparatus recited in claim 27, wherein said base liquid flow channel means are substantially equally dimensioned.

29. The apparatus recited in claim 27, wherein the permeate flow channel means are formed in the support means and the support means comprises support plate means having a support face adapted for receiving said membrane means thereon.

30. The apparatus recited in claim 27, wherein the support means comprises first ribs oriented in at least one first direction.

31. The apparatus recited in claim 30, wherein the first ribs define the permeate flow channel means.

32. The apparatus recited in claim 30, wherein the first ribs define said permeate flow channel means and extend the length of said flow channel means, at least one first channel disposed within said permeate flow channel means.

33. The apparatus recited in claim 30, further comprising second ribs disposed between said first ribs oriented in at least one second direction.

34. The apparatus recited in claim 33, wherein the second ribs define second channels therebetween and further comprising port means in fluid communication with said permeate flow channel means for draining the permeate fraction, said means for creating turbulence comprising said second ribs, said membrane means being deformable such that said first ribs deform said membrane means to form said base liquid flow channel means, said second ribs further deforming said membrane means to cause a turbulent flow of said base liquid in said base liquid flow channel means.

35. The apparatus recited in claim 34, wherein the second ribs are recessed from the level of the first ribs.

36. The apparatus recited in claim 35, wherein said second ribs include a first type of second ribs, recessed from the level of said first ribs, and a second type of second ribs, recessed from the level of said first ribs by a distance greater than the recess distance of said first type of second ribs, for causing further turbulent flow.

37. The apparatus recited in claim 36, wherein said first type of second ribs constitute about 20% of the total number of said second ribs.

38. The apparatus recited in claim 33, wherein said first ribs comprises longitudinal ribs and said first channel comprise a longitudinal channel, said second ribs comprising transverse ribs, disposed generally at right angles to said longitudinal channel and ribs.

39. The apparatus recited in claim 27, wherein said permeate and retentate fractions are separated based upon the molecular weight of the constituents thereof.

40. Cross-flow apparatus for separating a base liquid int a permeate fraction and a retentate fraction comprising:
 semi-permeable membrane means for separating the base liquid into the fractions;
 a plurality of separate base liquid flow channel means each disposed on a first side of said membrane means and being dimensioned for channeling the flow of the base liquid tangentially across said membrane means, said base liquid flow channel means being dimensioned such that the fluid velocity of said base liquid is substantially uniform across the membrane means, a portion of said base liquid comprising said permeate fraction flowing through said membrane means and into a plurality of permeate flow channel means disposed on an opposite second side of the membrane means, said permeate flow channel means being disposed on support means for carrying said membrane means.

41. The apparatus recited in claim 40, wherein said base liquid flow channel means are substantially equally dimensioned.

42. The apparatus recited in claim 40, wherein the permeate flow channel means are formed in the support means and the support means comprises support plate means having a support face adapted for receiving said membrane means thereon.

43. The apparatus recited in claim 40, wherein the support means comprises first ribs oriented in at least one first direction.

44. The apparatus recited in claim 43, wherein the first ribs define the permeate flow channel means.

45. The apparatus recited in claim 43, wherein the first ribs define the permeate flow channel means and extend the length of said flow channel means, at least one first channel disposed within said permeate flow channel means.

46. The apparatus recited in claim 43, further comprising second ribs disposed between said first ribs oriented in at least one second direction.

47. The apparatus recited in claim 46, wherein the second ribs define second channels therebetween and further comprising port mean s in fluid communication with said permeate flow channel means for draining the permeate fraction.

48. The apparatus recited in claim 42, wherein said membrane means conforms to said support plate means thereby forming said plurality of base liquid flow channel means on the side of said membrane mans opposite the side having said permeate flow channel means.

49. The apparatus recited in claim 40, wherein said permeate and retentate fractions are separated based upon the molecular weight of the constituents thereof.

50. The apparatus recited in claim 46, wherein said first ribs comprise longitudinal ribs and said first channel comprises a longitudinal channel, said second ribs comprising transverse ribs, disposed generally at right angles to said longitudinal channel and ribs.

51. Cross-flow apparatus for separating a base liquid into a permeate fraction and a retentate fraction comprising:
 a plurality of semi-permeable membrane means for separating the base liquid into the fractions;
 a plurality of groups of separate base liquid flow channel means, said base liquid flow channel means being substantially mutually parallel, each group of base liquid flow channel means disposed adjacent a first side of a respective one of said membrane means for channeling the flow of the base liquid tangentially across said respective one of said membrane means and for allowing a portion of said base liquid comprising said permeate fraction to flow through said respective membrane means into a group of permeate flow channel means, each of said base liquid flow channel means being dimensioned such that the fluid velocity of said base liquid is substantially uniform across the respective membrane means, each group of permeate flow channel means being disposed on a respective second side opposite the first side of each of said membrane means, each of said groups of permeate flow channel means being disposed on respective support surfaces of support means, each support means carrying two of said membrane means with said membrane means being disposed on opposite sides of said support means, the support surfaces of receiving said membrane means being disposed on each side of the support means, thereby forming a stack of said membrane means and support means.

52. The apparatus recited in claim 51, wherein each of said base liquid flow channel means are substantially equally dimensioned.

53. The apparatus recited in claim 51, wherein the support means comprises first ribs oriented in at least one first direction.

54. The apparatus recited in claim 53, wherein said first ribs define said permeate flow channel means.

55. The apparatus recited in claim 53, wherein said first ribs define said permeate flow channel means and extend the length of said flow channel means, at least one first channel disposed within said permeate flow channel means.

56. The apparatus recited in claim 53, further comprising second ribs disposed between said first ribs oriented in at least one second direction.

57. The apparatus recited in claim 56, wherein the second ribs define second channels therebetween and further comprising port means in fluid communication with said permeate flow channel means for draining the permeate fraction.

58. The apparatus recited in claim 51, wherein said permeate and retentate fractions are separated based upon the molecular weight of the constituents thereof.

59. The apparatus recited in claim 56, wherein the first ribs comprise longitudinal ribs and said first channel comprises a longitudinal channel, said second ribs comprising transverse ribs, generally at right angles to said longitudinal channel and ribs.

* * * * *